United States Patent [19]

Schultz et al.

[11] 4,405,046
[45] Sep. 20, 1983

[54] TRAY ATTACHMENT FOR A CHAIR

[75] Inventors: Roland P. Schultz, Costa Mesa; Steven P. Schultz, Huntington Beach, both of Calif.

[73] Assignee: LPS Industries, Inc., Newark, N.J.

[21] Appl. No.: 438,318

[22] Filed: Nov. 1, 1982

[51] Int. Cl.³ .................. F16M 13/00; B65D 1/34
[52] U.S. Cl. ............................. 206/557; 248/130; 248/131; 248/133; 248/145
[58] Field of Search ............... 206/557; 248/664, 677, 248/514, 515, 130, 131, 132, 133, 145, 161, 425

[56] References Cited

U.S. PATENT DOCUMENTS

| | | | |
|---|---|---|---|
| 1,790,123 | 1/1931 | Trimmer | 248/145 |
| 3,167,205 | 1/1965 | Smith | 248/133 |
| 3,214,121 | 10/1965 | Armstrong | 248/130 |
| 3,339,938 | 9/1967 | Edmisson | 248/145 |
| 3,527,356 | 9/1970 | Herdy | 248/131 |
| 3,802,656 | 4/1974 | Virblas | 248/145 |

Primary Examiner—Joseph Man-Fu Moy
Attorney, Agent, or Firm—Fitzpatrick, Cella, Harper & Scinto

[57] ABSTRACT

An improved tray attachment for a chair wherein a mounting mechanism for the tray is attached to the underside thereof, and is provided with a pin extending in parallel with one side of the tray, such pins having a free end for being slidably received in a mounting block, whereby the tray may be moved in forward and rearward directions by such slidable movement and may be pivoted to a vertical storage position about the axis of such pin. The mounting block is also pivotally mounted on a transverse horizontal extension of a vertical rod, wherein the tray may be raised and lowered by raising and lowering the vertical rod, and by fixing such rod to an arm of the chair at its desired height. The pivotal connection between the transverse rod and the mounting block permits the tray to be tilted, and a second vertical rod, attached to the opposite arm of the chair, may be raised and lowered to support the tray in a horizontal or tilted disposition. The point of contact between the tray and the second vertical rod is substantially displaced from the axis of tilting rotation of the tray, which axis is defined by the transverse rod position, and this displaced contact enhances the stability of support for the tray.

2 Claims, 4 Drawing Figures

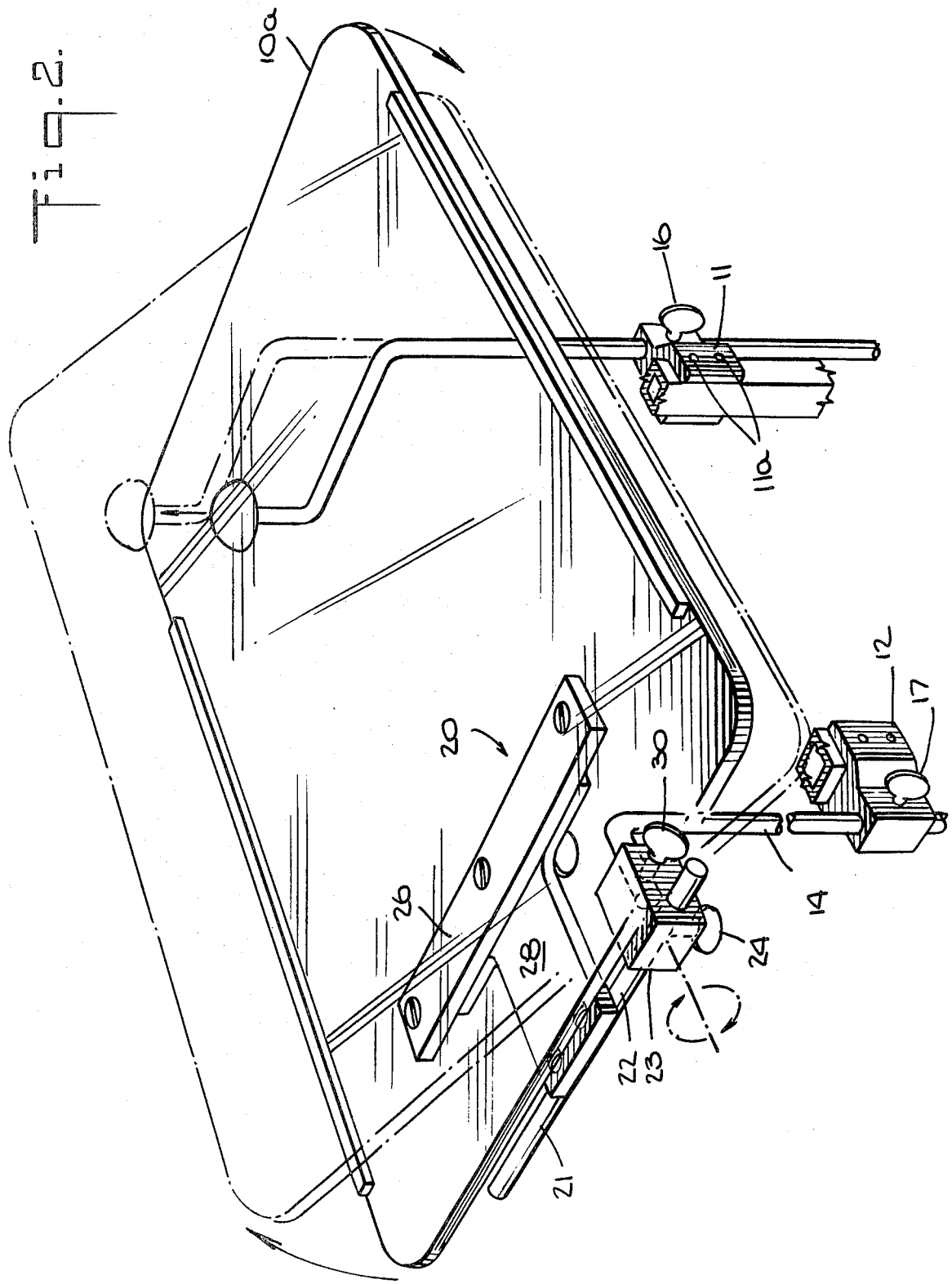

TRAY ATTACHMENT FOR A CHAIR

BACKGROUND OF THE INVENTION

For many years a need has existed for an improved tray attachment for a chair, wherein the tray is pivotable from a horizontal usable position to a vertical storage position next to the chair, and wherein the tray may be tilted when in its horizontal position. Although many tray attachments have been proposed in the past, few of such devices include all of the functions set forth above, and none of those have been sufficiently practical for wide spread use by the public. One device which has been popular, but which lacks the above-mentioned capability of being tilted, is disclosed in U.S. Pat. No. 3,999,798. That patent discloses a tray which may be pivoted from a horizontal disposition to a vertical disposition adjacent the chair. The mechanism permitting such pivotal movement differs, however, from that of the present invention. Accordingly, it is an object of the present invention to provide an improved tray assembly for a chair, in which a mechanism is provided to facilitate an easy adjustment of the tray from a horizontal usable position to a vertical storage position, and to permit the tray to be tilted and stably supported for use in such tilted position.

SUMMARY OF THE INVENTION

In accordance with the present invention a tray assembly is disclosed which is particularly useful, for example, in conjunction with a wheelchair, wherein the tray has mounting pins attached to its bottom surface for permitting the tray to be adjustably held (a) at any desired vertical height with respect to the arms of the chair, (b) at any one of a number of horizontal locations which are close in to the occupant of the chair or spaced in an extended position with respect to the occupant, (c) in a tilted position, wherein supports are provided to maintain the tray in a firmly supported tilted position, and (d) in a position wherein the tray is pivoted to a vertical position adjacent the side of the chair.

The mechanism which permits these various functions includes a pair of mounting pins, one of which projects forwardly, and one in the rearward direction of the tray, wherein the one of the two pins which is used at any one time is selected for insertion into a mounting block attached to one of the arms of the chair. The mounting block is provided with a thumb screw for engaging the selected mounting pin. Accordingly, the tray may be shifted forwardly and rearwardly with respect to the seat of the chair by loosening the thumb screw and sliding the bracket pin forwardly or rearwardly in the mounting block. Loosening of that thumb screw will also permit the entire tray to pivot around the bracket pin so that the tray may be stored in a vertical position immediately adjacent to the chair. The mounting block is coupled to a transverse bent-portion of a vertically disposed rod, wherein, the vertically disposed rod is held in a bracket attached to one of the arms of the chair. A thumb screw portion of the bracket permits the rod to be raised or lowered in order to raise or lower the entire tray assembly.

Furthermore, the bent portion of the rod is connected to the mounting block by a thumb screw, and since that portion of the rod extends in a transverse direction, the thumb screw may be loosened to permit the tray to be tilted with respect to the horizontal. A second vertical rod is held in a bracket at the opposing arm of the chair, and that second rod is also vertically adjustable by means of a thumb screw, so that the upper end of the second rod supports the side of the tray opposite the mounting pins. Furthermore, that second rod has a forwardly projecting bent-portion which displaces its contact point, with respect to the tray, as compared to the relative disposition of the mounting block at the opposed side of the tray. Accordingly, these support points for the tray are offset with respect to the tilting axis of the tray, which axis is defined by the connection between the transverse rod and the mounting block, so that the tray is provided with a balanced support to prevent it from being inadvertently tilted.

BRIEF DESCRIPTION OF THE DRAWINGS

In the following portions of this specification, a preferred embodiment of the invention will be described in detail in conjunction with the illustration of that embodiment depicted in the accompanying drawings, wherein:

FIG. 2 is an enlarged perspective view of the tray assembly depicted in FIG. 1.

DETAILED DESCRIPTION OF THE PREFERRED EMBODIMENT

Figure 1:
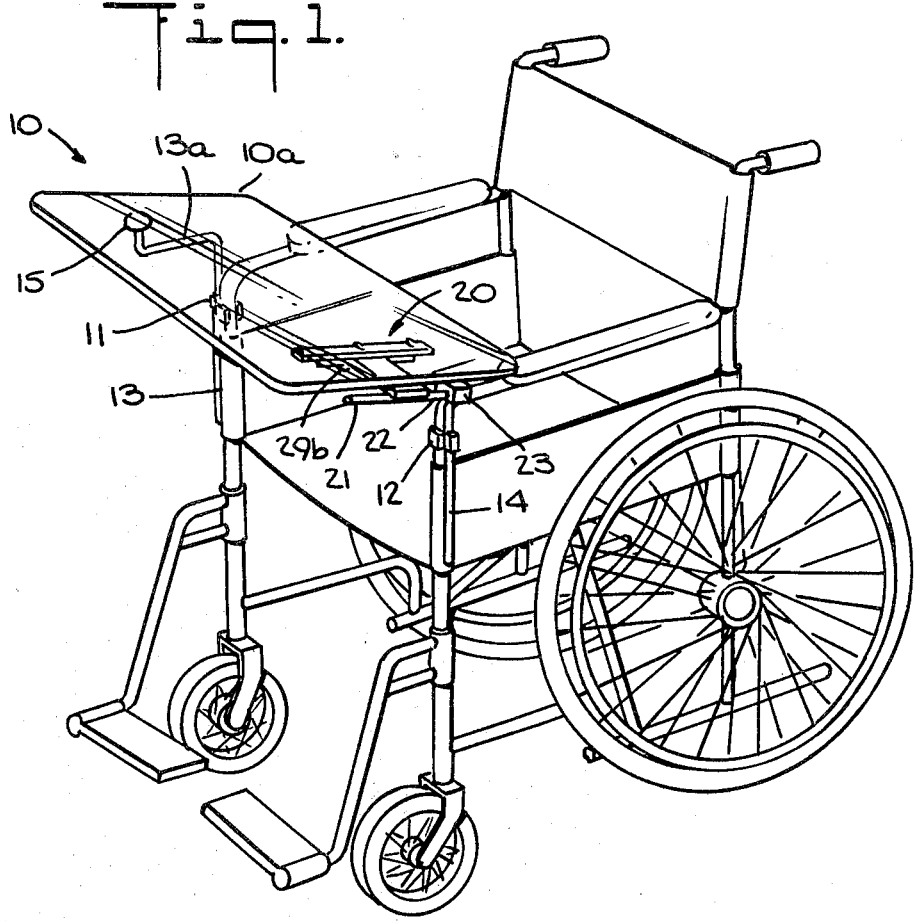
FIG. 1 is a perspective view of a wheelchair having a tray assembly attached thereto in accordance with the present invention.

Referring first to the perspective illustration of a wheelchair as shown in FIG. 1 of the drawings, a tray assembly 10 is coupled to the respective arms of the chair by a pair of brackets 11 and 12. Each of those brackets holds a vertically disposed rod, 13 and 14, for adjustment up and down to raise and lower the tray. One of the rods (13) has a rubber cushion 15 at its upper end for engaging the underside of the tray to support the same at any desired height or angle of tilt by merely sliding the rods 13 and 14 up and down in the brackets 11 and 12, and by fixing the rods at the desired height by means of thumb screws 16 and 17 as depicted in FIG. 2 of the drawings.

A mounting pin assembly 20 is fastened to the underside of the tray 10a, at an end thereof adjacent the bracket 12 and the rod 14, and that assembly 20 includes forwardly and rearwardly projecting pins 21 and 22 which are selectively received in a mounting block 23 coupled to the support rod 14. As shown in FIG. 1 the pin 22, which projects toward the user of the chair is engaged in the mounting block 23 so that the tray 10a is spaced at its maximum distance from the user. Alternatively, it will be appreciated that if the pin 21 projecting away from the user is placed in the mounting block 23, from the rearward face thereof, the tray 10a would be positioned much closer to the user. Some adjustability as to the position of the tray with respect to the user is provided by a thumb screw 24 which permits the mounting pins to be fixedly held after having been slidably adjusted to their desired position. Furthermore, by loosening the thumb screw 24 it is possible to pivot the entire tray assembly to a position at the side of the chair.

The details of the tray assembly are shown more clearly in the enlarged view depicted in FIG. 2 of the drawings, wherein it is seen that the assembly may be adjusted vertically by loosening the mounting rods 13 and 14 within the brackets 11 and 12. In this regard, the brackets 11 and 12 are fastened to the arms of the chair by means of set screws 11a and 12a.

The mounting pin assembly 20 fixed to the underside of the plate member 10a comprises a bar 26 fastened to the underside of the tray by means of screws which extend through the top surface thereof. A T-shaped plate 28 is slidably fastened to the bar 26 by means of thumb screws 29a and 29b which extend through a slot (not shown) in the top of the T-shaped plate so that the plate may be slidably adjusted, to a limited degree, with respect to the fixed mounting bar 26. At the outer end of the T-shaped plate, the pins (21, 22), in the form of a single rod, are attached to the plate by means of screws, so that one end of the rod 22 extends toward the user, while the other end 21 thereof extends away from the direction of the chair.

The adjustable relationships between the pins 21, 22 and the mounting blocks 23 are more readily apparent in FIG. 2 of the drawings wherein, as described above, the T-shaped plate 28 may be slidably moved with respect to the tray 10a, by loosening the thumb screws 29a, 29b which project through an elongated slot in the T-shaped plate 28. Also, the tray may be placed at a position which is spaced from the user by inserting the rearwardly projecting pin 22 through the opening in the mounting block 23 and tightening the thumb screw 24 at the desired position. In order to bring the tray 10a closer to the user, the rearwardly projecting pin may be removed from the mounting block, so that the tray can be moved toward the user and so that the forwardly projecting pin 21 can then be inserted into the mounting block 23 and fixed in placed by the thumb screw 24.

This pin and mounting block assembly also facilitates the pivotal displacement of the tray 10a in order to move the tray into a storage position. That is, the thumb screw 24 may be loosened so that the tray 10a and pin 22 may be rotated counterclockwise in the mounting block 23, and so that the horizontally disposed tray may be moved to a vertical position adjacent to the side of the chair.

As also described above, a thumb screw 30 may be loosened to permit the mounting block 23 to be pivoted about the upper transverse bend-portion of the rod 14, so that the tray may be tilted as shown in phantom lines in FIG. 2. In such event, if the tray were tilted into the disposition of the phantom lines as shown in FIG. 2, then it would be preferable to raise the rod 13 in order to support an outer portion of the tray's surface. By virtue of an offset portion 13a of the rod, the tray 10a is supported in a balanced state, since pressure on the forwardly projecting portion of the tray, which would constitute pressure at the end of a long lever arm with respect to the pivotal mounting line of the bend portion of the rod 14, would be balanced by the support of the rubber cushion 15. Adjustment of the rod 13, in order to bring the rubber cap 15 into contact with the raised forward portion of the tray, may be accomplished by loosening the thumb screw 16 and raising the rod 13.

By these means, a sturdy assembly is provided while using a minimum of parts, and while requiring a minimum number of thumb screws for being released and locked to position the tray in any one of a multitude of desired positions. For example, the raising and lowering of the entire tray assembly may be accomplished by manipulation of the thumb screws 16 and 17, while the tilting of the tray may be accomplished by release and movement of the elements associated with thumb screws 16 and 30. Furthermore, thumb screw 24 permits the tray to be pivoted to a vertical position adjacent the chair, while that thumb screw also holds the selected mounting pin in a fixed relation with the mounting block when the tray is in use.

Finally, an additional degree of forward and rearward adjustability is provided by the thumb screws 29a and 29b, wherein the shanks of those thumb screws project through an elongated slot in the T-plate 28.

Figure 3:
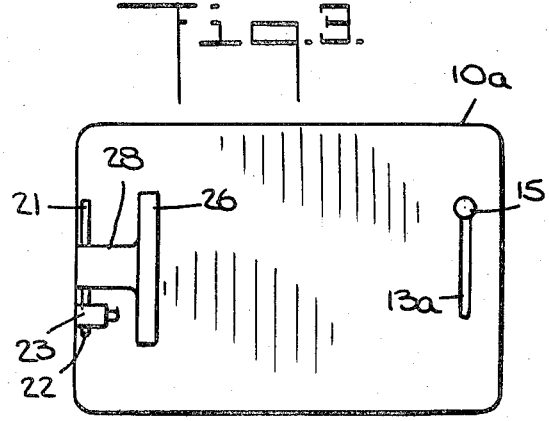
FIGS. 3 and 4 illustrate the manner in which the tray assembly may be mounted to either the left or right arms, respectively, of the chair.
Figure 4:
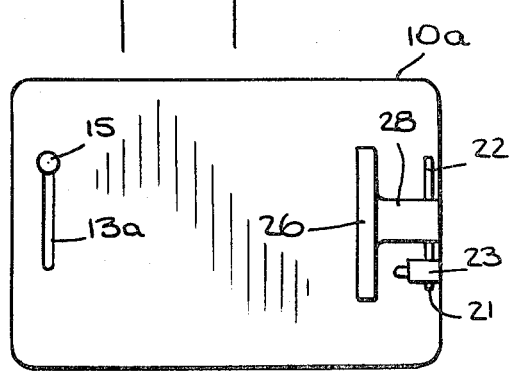

FIGS. 3 and 4 illustrate that the tray assembly 10 may be mounted on the chair so that the pin assembly 20 is to the left of the user as shown in FIG. 3, or to the right of the user as shown in FIG. 4. Accordingly, an advantageous degree of selectable dispositions of the tray assembly are permitted as depicted in the drawings, FIGS. 1-4.

Additional advantages and modifications of the invention will become apparent to those skilled in the art, and all equivalent structures are intended to be embodied herein by the present inventors.

We claim:

1. An improved tray assembly for a chair, wherein such tray is mounted to the chair for pivotal movement from a usable horizontal disposition to a vertically disposed storage position adjacent the chair, the improvement comprising: a planar tray member; bracket means for use in attaching the tray member to the chair, said bracket means being disposed at a side position of the tray member and having a mounting pin extending in a forward-rearward direction with respect to the tray member; a mounting block having an opening for receiving a free end of the mounting pin, and having means for locking the pin within said opening to prevent slidable or rotative movement thereof, wherein said locking means is releasable to permit the pin and tray member to be rotated, with respect to the axis of the pin, for selective movement between its said horizontal usable position and said vertical storage position; an assembly comprising a transverse rod and vertical rod, and means for connecting said rod assembly to one side of the chair and for vertically positioning said rod assembly at a desired height with respect to the chair, wherein said transverse rod is receivable in an opening of said mounting block, disposed at right angles to said pin opening, to permit the tray to be tilted about the axis of the transverse rod; and an opposed vertical rod disposed at the side of said chair opposed to said rod assembly, and a mounting device for selectively adjusting the vertical height of said opposed rod, wherein the upper end of said opposed rod contacts the underside of said tray member to support same, and wherein the position of said contact is displaced from the axis line of said transverse rod.

2. An improved tray assembly as set forth in claim 1, wherein said forward-rearward extending pin is provided with two free ends for selective receipt in said mounting block, thereby permitting the mounting block to be disposed at either the right or left sides of the chair, and wherein said pin permits the tray to be mounted closer to or extended away from an occupant of the chair.

* * * * *